(12) United States Patent
Cherian et al.

(10) Patent No.: US 7,689,890 B2
(45) Date of Patent: Mar. 30, 2010

(54) SYSTEM AND METHOD FOR HANDLING WRITE COMMANDS TO PREVENT CORRUPTED PARITY INFORMATION IN A STORAGE ARRAY

(75) Inventors: Jacob Cherian, Austin, TX (US); Nam V. Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1246 days.

(21) Appl. No.: 11/111,648

(22) Filed: Apr. 21, 2005

(65) Prior Publication Data
US 2006/0242540 A1 Oct. 26, 2006

(51) Int. Cl.
*H03M 13/00* (2006.01)
(52) U.S. Cl. .................... 714/766; 714/6; 714/769; 714/800; 714/801; 714/804; 711/114
(58) Field of Classification Search ............ 714/6, 714/766, 769, 800, 801, 804; 711/114
See application file for complete search history.

(56) References Cited

U.S. PATENT DOCUMENTS

| | | | |
|---|---|---|---|
| 5,640,506 A | 6/1997 | Duffy | |
| 5,737,744 A * | 4/1998 | Callison et al. | 711/114 |
| 5,805,788 A | 9/1998 | Johnson | |
| 6,542,960 B1 | 4/2003 | Wong et al. | |
| 6,898,668 B2 | 5/2005 | Thomson et al. | |
| 7,080,278 B1 * | 7/2006 | Kleiman et al. | 714/6 |
| 7,188,270 B1 | 3/2007 | Nanda et al. | |
| 7,437,658 B2 * | 10/2008 | Kobayashi | 714/801 |

* cited by examiner

*Primary Examiner*—Guy J Lamarre
(74) *Attorney, Agent, or Firm*—Baker Botts L.L.P.

(57) ABSTRACT

An architecture and method for executing write commands in a storage array is disclosed. The data strips of the data stripes of the storage array each include a parity check bit. The parity strip of each stripe includes a plurality of parity check bits, each of which is uniquely associated with one of the data strips of the stripes. The inclusion within each data stripe of parity bits associated with each data strip and the party strip provides a method for identifying a corrupted or degraded data condition that occurs as a result of a server failing fails during a write command.

20 Claims, 4 Drawing Sheets

SYSTEM AND METHOD FOR HANDLING WRITE COMMANDS TO PREVENT CORRUPTED PARITY INFORMATION IN A STORAGE ARRAY

TECHNICAL FIELD

The present disclosure relates generally to computer systems and information handling systems, and, more particularly, to a system and method for handling write commands directed to a RAID storage array.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

RAID storage arrays are characterized by the ability to restore or rebuild the information on a drive following a failure. For example, in a Level RAID 5 array, parity information is stored on the drives in the array. If one of the drives fails, it is rebuilt based on the parity information stored on the other drives in the array. In some RAID configurations, including Level 5 RAID arrays, a write to a disk in the disk array is accomplished according to a read-modify-write sequence. The result of a read-modify-write sequence is that the data of the write command is written to the disk and the associated parity strip of the stripe is updated to conform to the data strips of the stripe. When a data strip is modified by a write, the parity strip must likewise change. The execution of a read-modify-write command requires multiple writes, including a write to a data strip and a write to a parity strip. If a read-modify-write operation fails before the completion of the operation, incorrect data could be saved to the data strip and parity strip of the stripe. If a node fails during a read-modify-write operation at a time when only the parity data or only the write data has been committed to the storage array, the parity strip of the data stripe will be incorrect and will not conform to the other data stripes of the array. If at some later point, there is a disk failure in the RAID array, the parity strip cannot be used to reconstruct the data of the stripe of the failed node, as the stripe will result in the reconstruction of corrupted and incorrect data in the reconstructed data strip.

SUMMARY

In accordance with the present disclosure, an architecture and method for executing write commands in a storage array is disclosed. The data strips of the data stripes of the storage array each include a parity check bit. The parity strip of each stripe includes a plurality of parity check bits, each of which is uniquely associated with one of the data strips of the stripes. The execution of a write command to a stripe of the storage array includes the steps of calculating a new set of parity data and flipping the parity check bit of the target data strip and the associate parity check bit of the parity strip upon the successful completion of the physical writes to the target data strip and the parity strip. The inclusion within each data stripe of parity bits associated with each data strip and the party strip provides a method for identifying a corrupted or degraded data condition that occurs as a result of a server failure during a write command. When a server node fails during a write command, the next time that the data strip is accessed, whether by the same server after a reboot or by the alternate node or failover node in the case of a cluster configuration, the parity bit of the stripe is examined to determine if there is a match between the parity check bit of the data strip and the associated parity check bit of the parity strip. If there is a match, the write command is executed. If there is not a match, in addition to the completion of the write command, the parity strip is rebuilt and the parity check bits of the stripe are reset.

The system and method disclosed herein is technically advantageous because it provides an architecture and method for preventing a data discontinuity when a server node fails during a write command. The use of an additional set of parity check bits provides an additional layer of redundant data protection for read-modify-write operations, including writes to Level 5 RAID arrays. The use of the method disclosed herein allows for the identification of an instance in which a data strip and the parity strip may not conform to one another, requiring a rebuild of the parity strip. The method disclosed herein also allows for the identification of the instance in which the data strip and the parity strip conform, despite the failure of a server node during the write command. In this instance, however, it is not necessary to rebuild the parity strip.

Another technical advantage of the method disclosed herein is that the method can be implemented without the necessity of an additional drive or a strip of data. Instead, one additional check bit is used for each data strip and a plurality of additional check bits are used for the parity strip. As such, an additional measure of data integrity is provided in the event of a server node failure without a significant commitment of additional parity storage within the storage array. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
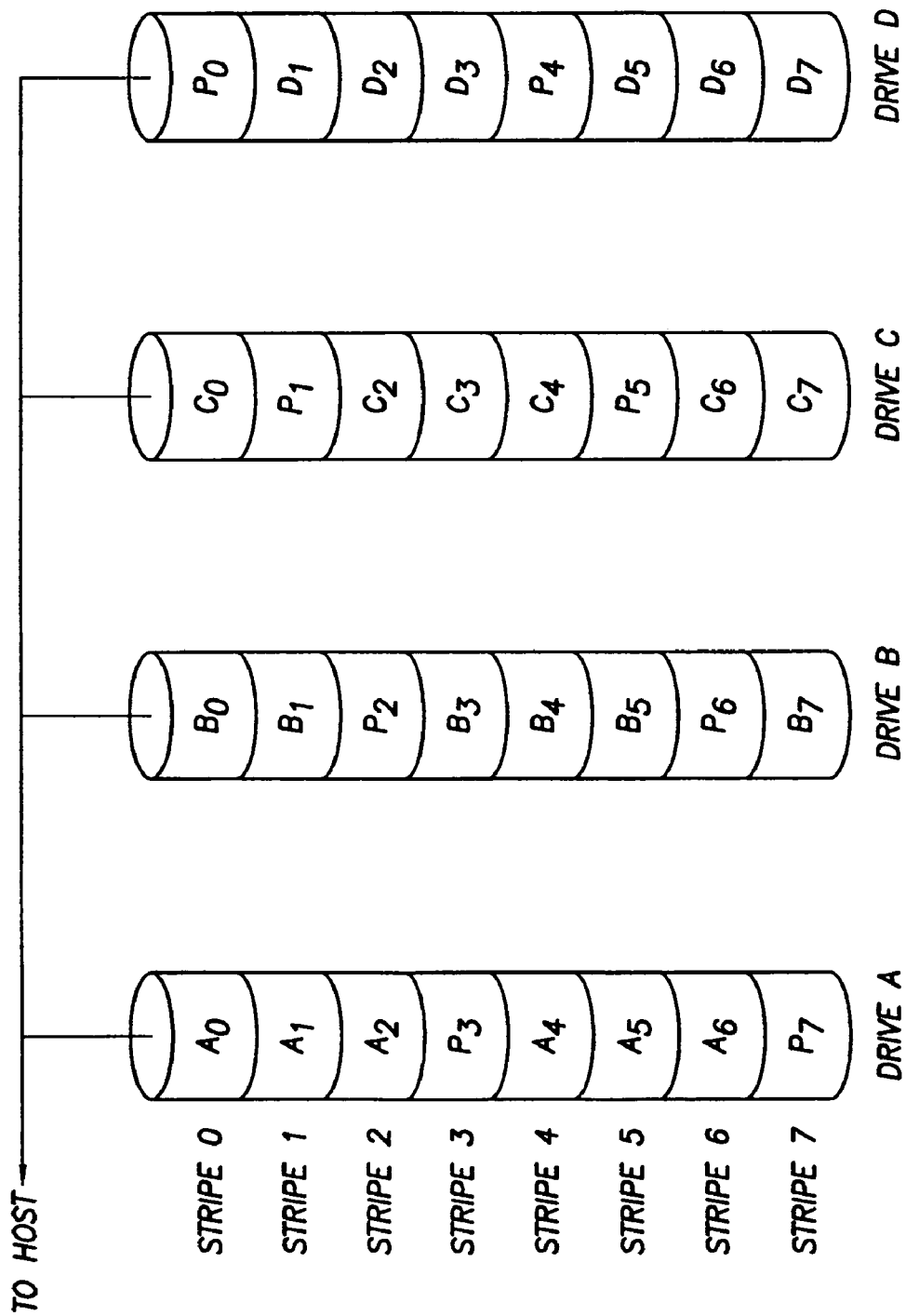
FIG. 1 is a diagram of a storage array.

FIG. 1 is a diagram of a Level 5 RAID storage array, which is indicated generally at 10. Storage array 10 includes five drives, which are sometimes referred to as disks or volumes. Each of the four drives in the example of FIG. 1 includes eight stripes or rows of data, labeled Stripe 0 through Stripe 7. It should be recognized that the configuration of the RAID array of FIG. 1 is simply an illustration of a RAID array, and that RAID array may to be configured to have more or fewer drives with more or fewer stripes or rows. With reference to Stripe 0, data is stored in data strips in Drive A, Drive B, and Drive C. The parity bits for Stripe 0, which are the result of an exclusive-OR operation performed on the content of Stripe 0 in Drive A, Drive B, and Drive C, are stored in a parity strip in Drive D and labeled $P_0$. As a second example of the data structure of the RAID Array 10, with reference to Stripe 7, data is stored in data stripes in Drive B, Drive C, and Drive D. The parity bits for Stripe 7, which are the result of an exclusive-OR operation performed on the content of Stripe 7 in Drive B, Drive C, and Drive D, are stored in a parity strip in Drive A and labeled $P_7$. If, for example, Drive C were to fail or otherwise be identified as a degraded drive, the data of Drive C would be rebuilt with the data in the other three drives of RAID array 10. As shown in FIG. 1, each of the drives in the storage array is coupled to one or multiple hosts. The term host, as used herein, denotes the resources of the network that provide access to the shared storage resources.

Figure 2:
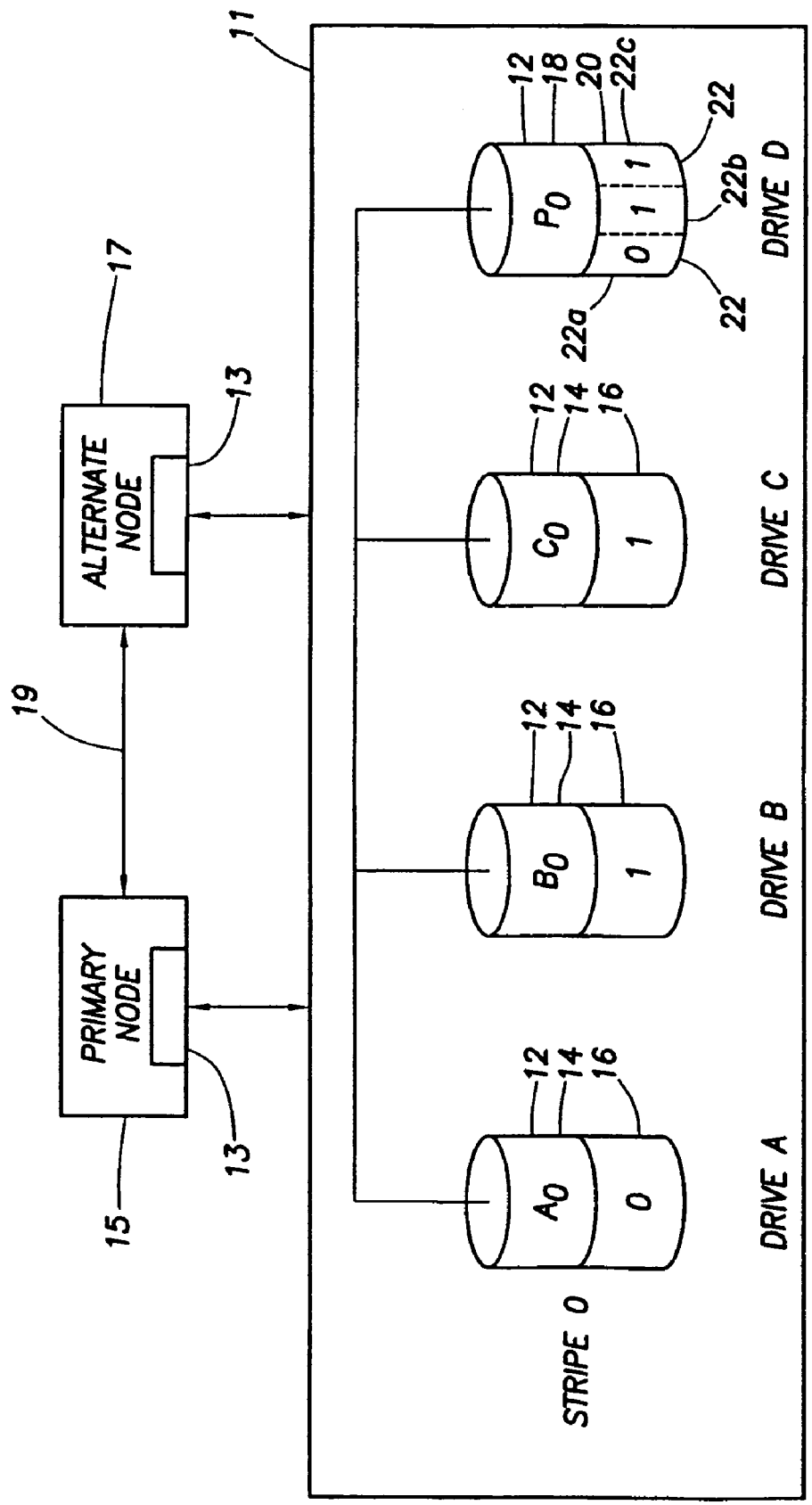
FIG. 2 is a single stripe of a storage array and a pair of server nodes.

Shown in FIG. 2 is a diagram of Level 5 RAID array 11, which is shown as having a single Stripe 0. Although a typical RAID array will have multiple stripes across the drives of the array, for purposes of illustration, the RAID depicted herein includes only a single stripe. In addition, for the purposes of illustration, the data and parity bits included in each strip are shown as being single bits. It is recognized, however, that each strip typically includes multiple bits of data. RAID array 11 is coupled to each of a primary node 15 and an alternate node 17. Primary node 15 is coupled to alternate node 17 through a communications link 19. Primary node 15 and alternate 17 may comprise cluster nodes and each will include a controller for managing the operations of the RAID array. In operation, the primary node is the logical owner of RAID array 11, and all accesses to the RAID array are controlled through the primary node. If the primary node fails, ownership of the RAID array is passed or failed over to the alternate node, which assumes control of the RAID array. Each node includes a storage controller 13 for managing the receipt of access commands, including write commands from the hosts of the network, and for managing the handling of commands submitted from the nodes to the RAID array.

The RAID array of FIG. 2 includes four drives 12. Drive A, Drive B, and Drive C include data strips 14, which are respectively labeled $A_0$, $B_0$, and $C_0$. Drive D includes a parity strip $P_0$ at 18, which includes the corresponding parity bits for the data bits at $A_0$, $B_0$, and $C_0$. Drives that include data strips have a parity check bit 16. In this example, each of Drive A, Drive B, and Drive C include a parity check bit 16 that is associated with the data strip of the drive. The drive that includes the parity strip includes a plurality of parity check bits that are equal in number to the number of data strips in the stripe. In this example, Drive D includes three parity check bits 22, each of which is associated with one of the data strips. Thus, the parity strip includes multiple parity check bits, each of which is uniquely associated with one of the data strips of the stripe. Each parity check bit of a data strip corresponds on a one-to-one basis with a parity check bit of the parity strip. As such, the parity check bit of Drive A, which is a logical 0 in the example of FIG. 2, corresponds with the first parity check bit $22a$ of Drive D, which is also a logical 0. Similarly, the parity check bit of Drive B (a logical 1) is associated with the second parity check bit $22b$ of Drive D (also a logical 1); and the parity check bit of Drive C (a logical 1) is associated with the parity check bit $22c$ of Drive D. In this example, the parity checks bits are in order, as each respective parity check bit of a data strip has the same logical value as the associated parity check bit of the parity strip. The parity check bits may be stored on a block basis on the media of each respective drive. For the purpose of storing the parity check bits, the drives may be formatted with blocks that are larger than the block size typically defined for data storage.

Figure 3:
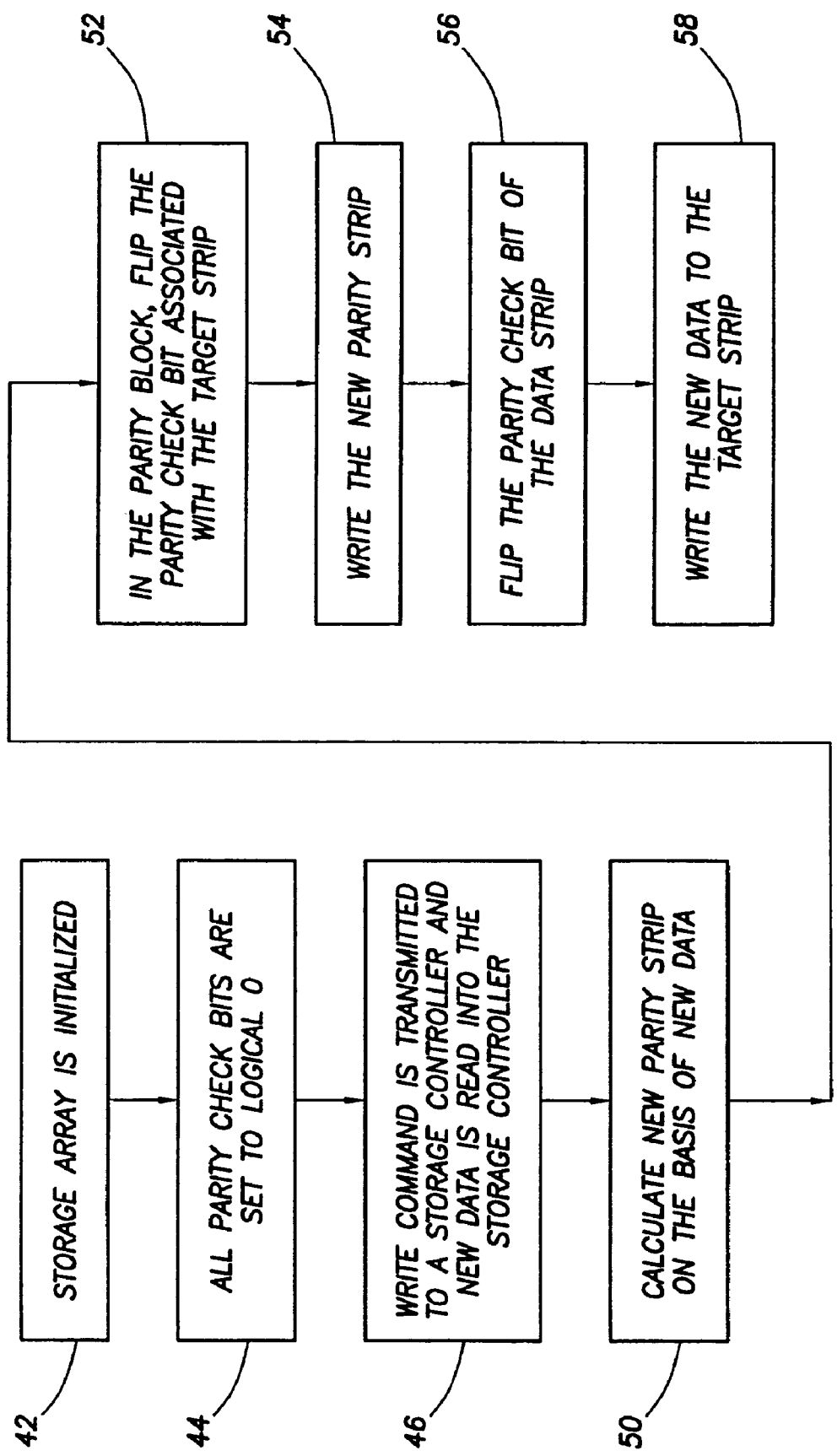
FIG. 3 is a flow diagram of a method steps for initializing and setting the parity check bits of the data strips and the parity strip of a stripe of a storage array.

Shown in FIG. 3 is a flow diagram of a series of method steps for initializing and setting the parity check bits of the data strips and the parity strip. At step 42, the storage array is initialized, and all of the parity bits of the data strips and the parity strip are set to a logical 0 at step 44. At step 46, following the initialization of the storage array, a write command is transmitted to the storage controller of the node that presently owns the logical unit that comprises the RAID array. After the data of the write command is read into the storage controller, at step 50, a new parity strip for the stripe is calculated on the basis of a comparison of the existing parity strip, the new data that is the subject of the write command, and the old data that occupies the data strip that is the subject of the write command.

Following the calculation of the new parity strip, the new parity data is written to the parity strip of the stripe of the RAID array that will include the data of the write command. After the new parity strip is calculated, the parity check bit of the parity strip that is associated with the drive that is the target of the write command is flipped at step 52, and the new parity strip is written to the storage array at step 54. At step 56, the parity check bit of the data strip is flipped, and, at step 58, the data of the write command is written to the target data strip of the storage array. Following the execution of the write command at the target data strip, and the parity check bit of the target data strip is flipped. Following this series of commands, the data of the write command is written to the target data strip and the parity strip has been updated to reflect the content of the data strips of the stripe. Moreover, the parity check bit of the data stripe has been flipped, and the associated parity check bit of the parity strip has also been flipped. Following this sequence the parity check bit of the data stripe has the same logical value as the associated parity check bit of the parity strip. The steps of executing the write command may also include the steps of determining, before or after the execution of the write command, whether the parity check bit of the target data strip matches the associated parity check bit of the parity strip. This check step could be performed to confirm that the parity strip has been updated to reflect the amended content of the data strip.

Figure 4:
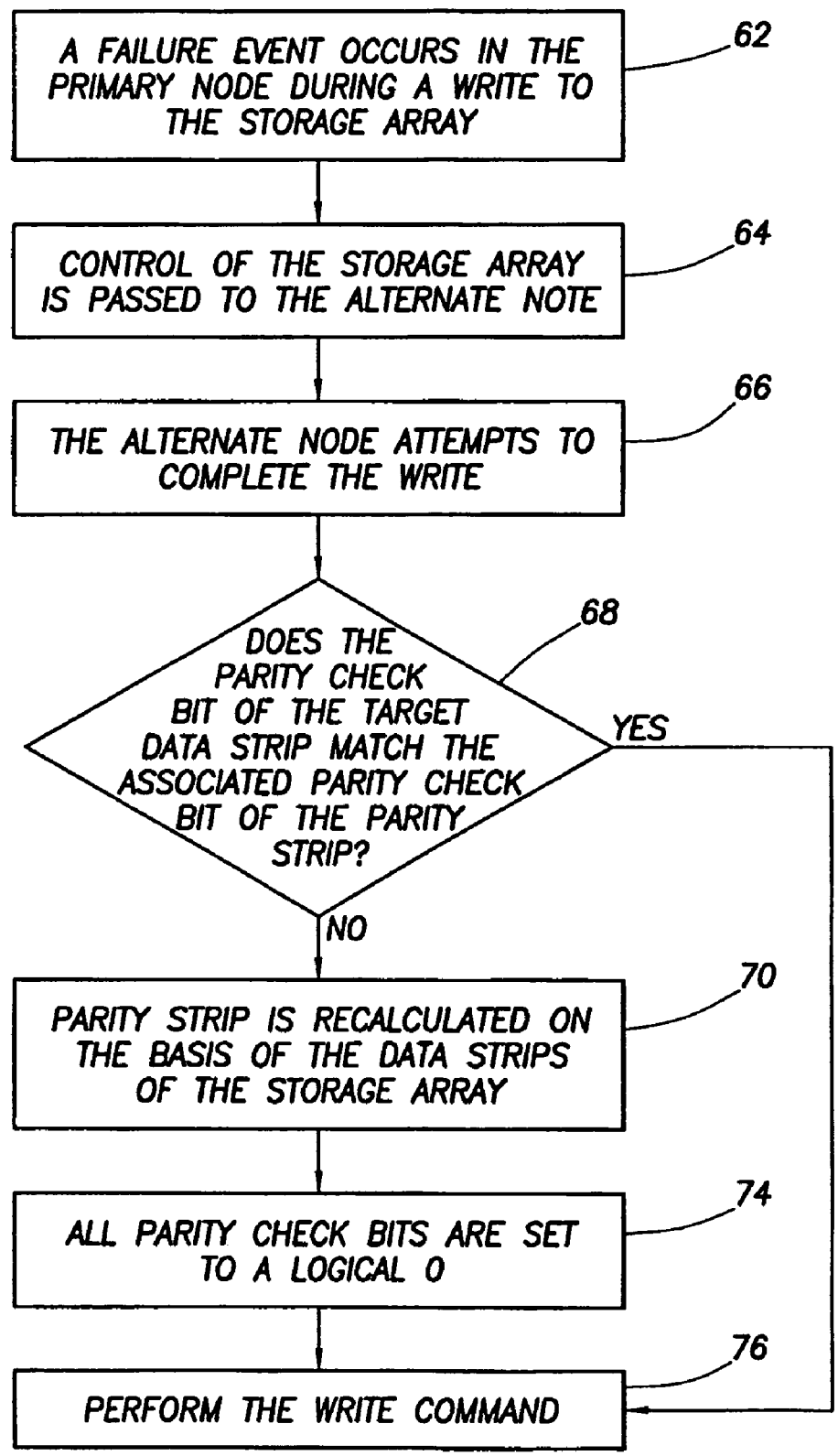
FIG. 4 is a flow diagram of a method for using parity check bits to recover from the failure of a node during a write to the storage array.

Shown in FIG. 4 are a series of method steps that involve the use of the parity check bits to recover from the failure of a node during a write to the storage array in a cluster configuration. At step 62, a failure occurs in the primary node during a write to the storage array. Following the recognition of the failure, the failed node reboots or ownership and control of the storage array is passed to an alternate node. At step 66, the original or alternate node attempts to complete the write command that was initiated at the primary node. At step 68, the node determines if the parity check bit of the target data strip has the same logical value as the associated parity check bit of the parity strip. If the parity check bit of the target data strip has the same logical value as the associated parity check bit of the parity strip, there is not a conflict between the content of the target data strip and the parity strip. If there is not a conflict between the content of the target data and the parity strip, the flow diagram continues at step 76 with the execution of the write command in read-modify-write mode following the steps set out in FIG. 3.

If the parity check bit of the target data strip does not have the same logical value as the associated parity check bit of the parity strip, then it is likely that the associated parity check bit of the parity strip has been flipped and the parity check bit of the target data strip has not been flipped, which could indicate that the parity strip has been updated but the target data strip has not been updated. Because the write operation to the parity strip and the write operation to the data strip are asynchronous, the disparity between parity check bits could indicate that the data strip has been updated but its parity strip has not been updated. In either case, the parity strip is inconsistent and needs to be recalculated. At step 70, the parity strip of the stripe is recalculated on the basis of the data in each of the data strips. At step 74, all of the parity check bits of the data strips and the parity strips are set to a logical 0. The write command is initiated at step 76 to both the data strip and the parity strip. The determination of a potential data conflict at step 68 results in the recalculation of the parity strip and the resetting of all parity check bits for the reinitiation of the write command.

The use of the parity check bits of the data strips and the associated parity check bits of the parity strips provides an additional layer of parity checking that protects the data integrity of the storage array in the event of a failure in a server node during a write operation to the storage array. The write method disclosed herein is not limited in its application to RAID storage arrays or to a particular RAID storage level. Rather, the technique disclosed herein may be used in connection with any logical write command that involves multiple physical write commands. Although present disclosure has been described in detail, it should be understood that various changes, substitutions, and alterations can be made hereto without departing from the spirit and the scope of the invention as defined by the appended claims.

What is claimed is:

1. A method for executing a write command in the storage drives of a storage array, wherein the write command is directed to a target data strip within the data stripe of the storage array, comprising:
    calculating new parity data for the data stripe on the basis of the data of the write command;
    flipping in the parity strip a parity check bit associated with the target data strip;
    writing the new parity data to the parity strip;
    flipping the parity check bit of the target data strip; and
    writing the data of the write command to the target data strip.

2. The method for executing a write command of claim 1, wherein the step of calculating new parity data for the data stripe comprises the step of calculating new parity data on the basis of the data of the write command, the existing content of the target data strip, and the existing content of the parity strip.

3. The method for executing a write command of claim 1, wherein the step of writing the new parity data to the parity strip is performed following the step of flipping in the parity strip a parity check bit associated with the target data strip.

4. The method for executing a write command of claim 1, wherein the step of flipping the parity check bit of the target data strip is followed by the issuance of a write command to the target data strip.

5. The method for executing a write command of claim 1, further comprising the step of performing the initial step of resetting the parity check bits of the storage array upon initialization of the storage array.

6. The method for executing a write command of claim 1, wherein the storage drives of the storage array are configured according to a RAID Level 5 storage methodology.

7. The method for executing a write command of claim 1, further comprising the step of determining whether the parity check bit of the target data strip matches the parity check bit of the parity strip that is associated with the target data strip.

8. The method for executing a write command of claim 1,
    wherein the step of writing the new parity data to the parity strip is performed following the step of flipping in the parity strip a parity check bit associated with the target data strip; and
    wherein the step of flipping the parity check bit of the target data strip is followed by the issuance of the write command to the target data strip.

9. The method for executing a write command of claim 1,
    wherein the step of calculating new parity data for the data stripe comprises the step of calculating new parity data on the basis of the data of the write command, the existing content of the target data strip, and the existing content of the parity strip;
    wherein the step of writing the new parity data to the parity strip is performed following the step of flipping in the parity strip a parity check bit associated with the target data strip;
    wherein the step of flipping the parity check bit of the target data strip is followed by the issuance of the write command to the target data strip; and
    wherein the storage drives of the storage array are configured according to a RAID Level 5 storage methodology.

10. A method for executing a write command in the storage drives of a storage array, wherein the write command is directed to a target data strip within a data stripe of the storage array, comprising:
    recognizing a failure in a server node that has logical ownership over the storage array during a write to the drive array;

transferring control over the storage array to an alternate node;

determining if a parity check bit of the target data strip has the same logical value as an associated parity check bit of a parity strip of the data stripe; and if the parity check bit of the target data strip does not have the same logical value as an associated parity check bit of a parity strip of the data stripe, performing the steps of:

calculating new parity data on the basis of the data strips of the stripe;

writing the new parity data to the parity strip; and resetting all of the parity check bits of the data stripe.

11. The method for executing a write command in the storage drives of a storage array of claim 10, wherein the parity check bit of the target data strip is stored on a block that is formatted to include the data of the target data strip and the parity check bit.

12. The method for executing a write command in the storage drives of a storage array of claim 10, wherein the storage drives of the storage array are configured according to a RAID Level 5 storage methodology.

13. The method executing a write command in the storage drives of a storage array of claim 10, further comprising the step of, if the parity check bit of the target data strip does have the same logical value as an associated parity check bit of the parity strip of the data stripe, performing the steps of:

calculating new parity data for the data stripe on the basis of the data of the write command;

flipping in the parity strip the parity check bit that is associated with the target data strip;

writing the new parity data to the parity strip;

flipping the parity check bit of the target data strip; and writing the data of the write command to the target data strip.

14. The method executing a write command in the storage drives of a storage array of claim 13, wherein the step of calculating new parity data for the data stripe comprises the step of calculating new parity data on the basis of the data of the write command, the existing content of the target data strip, and the existing content of the parity strip.

15. The method for executing a write command in the storage drives of a storage array of claim 14, wherein the step of writing the new parity data to the parity strip is performed following the step of flipping in the parity strip a parity check bit associated with the target data strip.

16. The method for executing a write command in the storage drives of a storage array of claim 15, wherein the step of flipping the parity check bit of the target data strip is followed by the issuance of a write command to the target data strip.

17. The method for executing a write command in the storage drives of a storage array of claim 16, wherein the storage drives of the storage array are configured according to a RAID Level 5 storage methodology.

18. A system for executing a write command in the storage drives of a storage array comprising:

a server node;

a storage array comprising multiple drives coupled together and configured as a set of drives to store data according to a redundant storage methodology;

a parity data for a data stripe wherein the parity data is calculated by the server node on the basis of the data of the write command;

a parity check bit in a parity strip associated with a target data strip wherein the parity check bit is flipped;

wherein the new parity data is written to the parity strip;

wherein a parity check bit of the target data strip is flipped; and wherein the data of the write command is written to the target data strip.

19. The system for executing a write command of claim 18, wherein the parity data for a data strip is calculated by the server node on the basis of the data of the write command, the existing content of the target data strip, and the existing content of the parity strip.

20. The system for executing a write command of claim 18, wherein the storage drives of the storage array are configured according to a RAID Level 5 storage methodology.

* * * * *